No. 683,453. Patented Oct. 1, 1901.
P. H. ERTHEILER.
PROCESS OF MANUFACTURING CIGARS.
(Application filed Aug. 29, 1900.)
(No Model.)
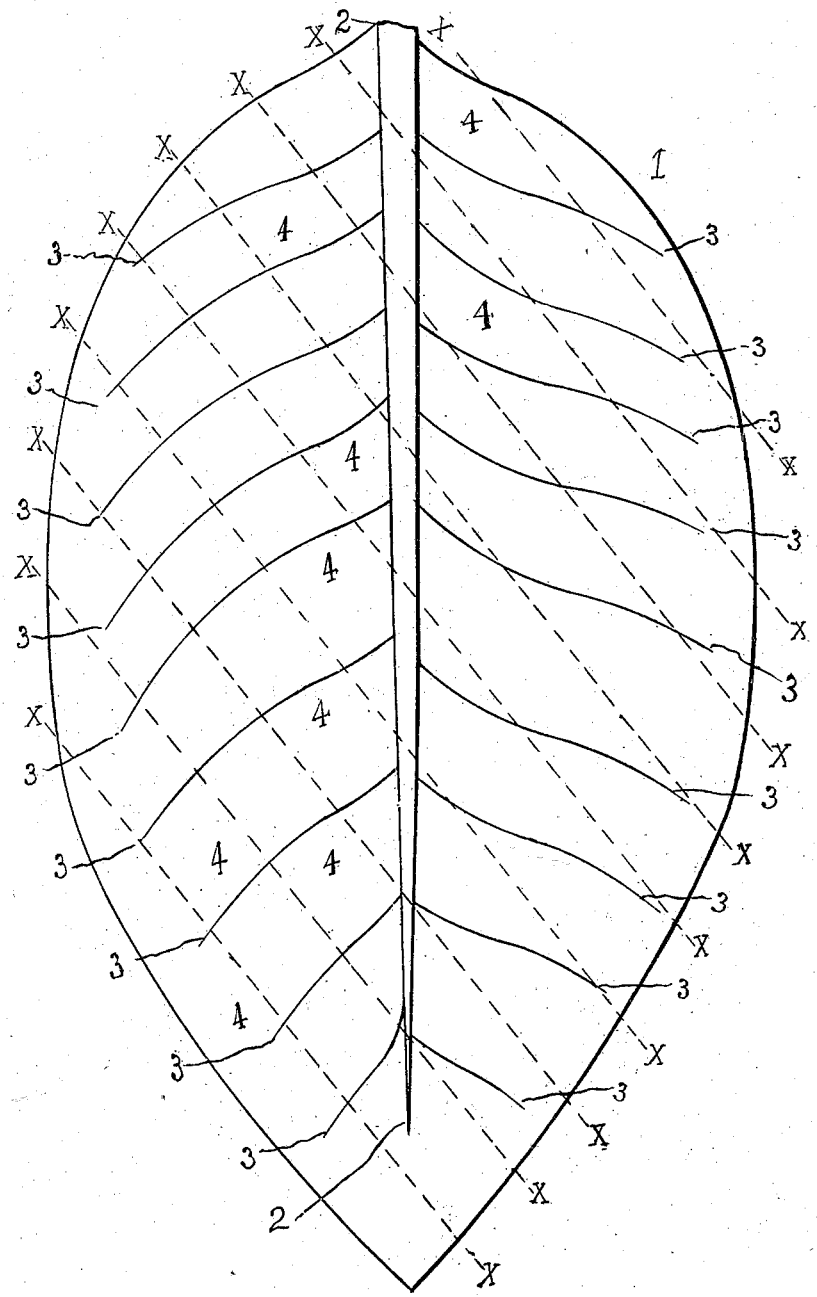
WITNESSES:
J. H. Schreiner
Gilbert Weir
INVENTOR
Philip H Ertheiler
by S Wiegand
atty

UNITED STATES PATENT OFFICE.

PHILIP H. ERTHEILER, OF PHILADELPHIA, PENNSYLVANIA.

PROCESS OF MANUFACTURING CIGARS.

SPECIFICATION forming part of Letters Patent No. 683,453, dated October 1, 1901.

Application filed August 29, 1900. Serial No. 28,468. (No specimens.)

*To all whom it may concern:*

Be it known that I, PHILIP H. ERTHEILER, a citizen of the United States, residing at No. 211 South Forty-fifth street, in the city and county of Philadelphia and State of Pennsylvania, have invented a new and useful Improvement in Cigars and Fillers Therefor, of which the following is a specification.

This invention relates to cigars for smoking, and has for its object the economy of material and labor in the production and superior quality in smoking; and it consist in forming the body or filler of the cigar of the entire leaf, including the stem or rib, which in the ordinary and usual mode of manufacture is stripped out and rejected.

The mode of manufacture is illustrated in the accompanying drawing.

The mode of making cigars by this process consists in spreading the leaf of tobacco and running the leaves through a series of rollers for the compression and rendering the stem of the same thickness and pliability as the other parts of the leaf, at the same time absorbing from the leaf the moisture that has been applied in the preparation of the leaf, and thereby putting into proper condition for immediate manufacture—that is, in proper moist condition to be used at once without the necessity of first drying and then remoistening, as has been heretofore practiced, thereby saving the necessity of stripping a quantity in advance of use, thus permitting the manufacturer to use the material, as required.

The drawing shows a leaf of tobacco with the stem flattened and rolled to the thickness, as nearly as may be, of the web of the leaf, with the line for cutting it into filler-strips marked thereon. The leaf is marked 1 in the drawing, the stem 2, the veins 3, and the filler-strips 4. The filler-strips are cut upon the lines indicated in dotted lines marked *x x* in the drawing diagonally to the stem 2 and, as nearly as may be, diagonally across the veins 3. The strips 4 thus cut include the stem or rib in sections oblique to the line of the strip. I cut diagonally to the line of the stem 2 on the lines marked *x x* from the leaf thus prepared strips 4 of length including the stem or rib. These strips form the filler or body of the cigar and are covered by a binder and wrapper in the usual manner. I cut the binder into strips of sufficient length and width and use the same by tucking or fastening one end into the tuck of the cigar and wrapping it around the bunch and fastening it by turning it into the other end, and I thus prevent the unwrapping of the bunch as in the old way while preparing the wrapper ready to put thereon. By using the stem as a component part of the filler the aroma contained therein contributes to the strength of the cigar, and by cutting the tobacco diagonally in strips for the filler instead of grinding it into scrap the annoyance of short pieces of tobacco, commonly known as "scrap" or "short filler," becoming detached and entering the mouth is avoided. The saving of material in stripping, as well as the expense of labor, is included in this method or process, and the stem being used there is no scrap or rejected and wasted parts of the leaf, and by cutting it into long fillers instead of stripping or tearing it from the stem, as is ordinarily practiced in stripping, all parts of the leaf are attached to each other and maintain their connected relation to the stem, and the moisture remains in for a longer period than if separated, and the strength, flavor, aroma, and all the components are conserved and contribute to the value of the cigar.

This process is particularly useful in tender-leaf tobacco, because in stripping such tobacco the finer parts are more or less turned into scrap when detached by the stripping process, and therefore become of reduced value. By this process or method the blending of different tobaccos is effected with a certainty or equal distribution by laying the leaves in the desired quantity and combination of grade, quality, and ages of different crops in piles and cutting diagonally through the pile. After cutting the filler in the manner above described the stem is hardly perceptible when the cigar is cut open, as by means of the use of the rollers the stem has become as pliable as the leaf itself, and the disposition of the stem of the leaf in lengthwise position secures a clear draft and prevents the cigar from choking or strangling. The filler cannot become twisted, the free draft is insured, the burning qualities are fully developed, the aroma greatly improved, and the full strength of the tobacco retained and utilized. The rib or stem of the tobacco-leaf is capable of maintaining combustion for a longer period than the web of the leaf, and by including the stem in the filler with the leaf a more continuous holding of the fire is insured.

Having described my invention, what I claim is—

1. An improved filler for cigars consisting of strips of tobacco-leaf cut diagonally to the stem from leaves having the stem previously crushed or flattened.

2. An improved article of manufacture consisting of a cigar having a long diagonally-cut filler including sections of the stem disposed and arranged as set forth.

PHILIP H. ERTHEILER.

Witnesses:
J. H. SCHREINER,
A. C. FLEYDELL.